United States Patent
Krogsgaard et al.

(10) Patent No.: US 9,344,812 B2
(45) Date of Patent: May 17, 2016

(54) PORTABLE ELECTRONIC DEVICE FOR WEARING AT THE EAR AND A METHOD OF OPERATING A PORTABLE ELECTRONIC DEVICE

(75) Inventors: Klaus Krogsgaard, Lynge (DK); Torsten Lund-Olesen, København V (DK); Christian Kallesoee, København Ø (DK); Jan Harry Hales, Søborg (DK); Leif Hoejslet Christensen, Roskilde (DK); Preben Kidmose, Maarslet (DK)

(73) Assignee: TEKNOLOGISK INSTITUT, Taastrup (DK)

( * ) Notice: Subject to any disclaimer, the term of this patent is extended or adjusted under 35 U.S.C. 154(b) by 126 days.

(21) Appl. No.: 14/237,389

(22) PCT Filed: Dec. 16, 2011

(86) PCT No.: PCT/EP2011/073030
§ 371 (c)(1),
(2), (4) Date: Apr. 18, 2014

(87) PCT Pub. No.: WO2013/087118
PCT Pub. Date: Jun. 20, 2013

(65) Prior Publication Data
US 2014/0233776 A1    Aug. 21, 2014

(51) Int. Cl.
H04R 25/00 (2006.01)
H04R 1/10 (2006.01)
(Continued)

(52) U.S. Cl.
CPC .............. *H04R 25/00* (2013.01); *H04R 1/1025* (2013.01);
(Continued)

(58) Field of Classification Search
CPC ........ H04R 25/00; H04R 25/60; H04R 25/65; H04R 25/70; H04R 25/356; H04R 25/456; H04R 25/505; H04R 25/552; H04R 25/554; H04R 25/558; H04R 25/604; H04R 25/652; H04R 25/658; H04R 2225/021; H04R 2225/025; H04R 2225/63
USPC .......................... 381/312, 315, 322, 328, 330
See application file for complete search history.

(56) References Cited

U.S. PATENT DOCUMENTS 7,372,971 B2 * 5/2008 Roeck ................... F17C 11/005
381/322
8,031,878 B2 * 10/2011 Gauger, Jr. ........... H04R 1/1025
381/311

FOREIGN PATENT DOCUMENTS

DE        10115429 A1    5/2002
WO        02/067628 A1   8/2002

OTHER PUBLICATIONS

International Search Report for PCT/EP2011/073030 dated Jul. 20, 2012.
Ngok-Man Sze et al, Threshold Voltage Start-up Boost Converter for Sub-mA Applications, Electronic Design, Test and Applications, 2008. 4th IEEE International Symposium on Electronic Design Test & Applications, IEEE, Piscataway, NJ, USA, Jan. 23, 2008, pp. 338-341, XP31234507. P. Chapman et al, "Low-Input Voltage, Low-Power Boost Converter Design Issues", IEEE Power Electronics Letters, IEEE Service Center, NY, NY, US, vol. 2, No. 3, Sep. 1, 2004, pp. 96-99, XP011122170.

(Continued)

*Primary Examiner* — Brian Ensey
(74) *Attorney, Agent, or Firm* — Sughrue Mion, PLLC

(57) ABSTRACT

A portable electronic device (100) comprises a fuel cell (101) and a boost converter (102), wherein said boost converter (102) is adapted for boosting the fuel cell voltage to a level suitable to power the portable electronic device (100) and wherein said boost converter (102) is powered by said fuel cell (101). The invention also provides a method of operating a portable electronic device.

15 Claims, 5 Drawing Sheets

(51) Int. Cl.
*H04R 25/02* (2006.01)
*H01M 8/10* (2016.01)

(52) U.S. Cl.
CPC ............ *H04R 25/02* (2013.01); *H01M 8/1011* (2013.01); *H01M 8/1013* (2013.01); *H01M 2250/30* (2013.01); *H04R 2225/31* (2013.01); *H04R2225/33* (2013.01); *H04R 2225/67* (2013.01); *H04R 2460/03* (2013.01); *Y02B 90/18* (2013.01)

(56) References Cited

OTHER PUBLICATIONS

A. Bertacchini et al, "250mV Input Boost Converter for Low Power Applications", Industrial Electronics, (ISIE), 2010 IEEE International Symposium, IEEE, Piscataway, NJ, USA, Jul. 4, 2010, pp. 533-538, XP031803428.

* cited by examiner

US 9,344,812 B2

PORTABLE ELECTRONIC DEVICE FOR WEARING AT THE EAR AND A METHOD OF OPERATING A PORTABLE ELECTRONIC DEVICE

CROSS REFERENCE TO RELATED APPLICATIONS

This application is a National Stage of International Application No. PCT/EP2011/073030 filed Dec. 16, 2011, the contents of all of which are incorporated herein by reference in their entirety.

FIELD OF THE INVENTION

The present invention relates to portable electronic devices. Further, the present invention relates to a method of operating a portable electronic device.

BACKGROUND OF THE INVENTION

In the context of the present disclosure a portable electronic device should be understood as a small microelectronic device designed to be worn on the human body. Especially the portable electronic devices may be adapted to be at least partly worn at or in the human ear. Examples of such devices include hearing aids and some types of portable electronic sensor systems.

A variety of hearing aid types exist and a few of these are further described below. Behind-The-Ear (BTE) hearing aids are worn behind the ear. To be more precise an electronics unit comprising a housing containing the major electronics parts thereof is worn behind the ear. An earpiece for emitting sound to the hearing aid user is worn in the ear, e.g. in the concha or the ear canal. A connector connects the earpiece to the housing. In a traditional BTE hearing aid, a sound tube is used because the output transducer, which in hearing aid terminology is normally referred to as the receiver, is located in the housing of the electronics unit. In some modern types of hearing aids a conducting member comprising electrical conductors is used, because the receiver is placed in the earpiece in the ear. Such hearing aids are commonly referred to as Receiver-In-The-Ear (RITE) hearing aids. In a specific type of RITE hearing aids the receiver is placed inside the ear canal. This is known as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This type is known as Completely-In-Canal (CIC) hearing aids. This type of hearing aid requires a very compact design in order to allow it to be arranged in the ear canal, while accommodating the components necessary for operation of the hearing aid. Other types of hearing aids include cochlear implants and bone conducting hearing aids. Other devices that resemble hearing aids are e.g. devices for the treatment of tinnitus and devices for relieving stress and anxiety.

A great variety of portable electronic sensor systems exist that qualify as portable electronic devices in the context of the present disclosure. One variety is systems comprising means for EEG monitoring. These systems are applicable for a lot of medical purposes such as:

- monitoring the user's brain waves for evaluation of the result of a medical treatment;
- monitoring the user's brain waves for detection of medical states, and possibly alerting the user, caretakers, or relatives, wherein examples of such medical states are impending hypoglycemia and epileptic seizures;
- monitoring the user's brain waves for the purpose of diagnosing medical conditions. Examples of such conditions are epileptic conditions such as absence epilepsy, neurodegenerative conditions such as Parkinson's disease, and psychiatric disorders such as Schizophrenia or Anxiety disorders;
- providing Audio Feedback for the purpose of treating a disease or a disorder such as Attention Deficit Hyperactivity Disorder (ADHD), tinnitus, or phantom pain sensations; and
- providing a Brain-Computer Interface or Man-Machine Interface for enabling the user to control the device it-self or for controlling peripheral devices.

A range of standard batteries such as e.g. batteries of the Zn-air type are suitable for powering a portable electronic device according to the invention.

However, e.g. Zn-air batteries are disadvantageous in that they are not very environmentally friendly because they are not re-chargeable and contain mercury. Consequently a drive towards more environmental friendly power sources exists.

Within the art of hearing aids it has therefore been proposed to use fuel cells as power source.

DE-A1-10115429 discloses a hearing aid powered by a fuel cell capable of providing a voltage of 1.19 V.

Fuel cells are an environmentally friendly power source, but generally fuel cells are not capable of meeting the power requirements while at the same time fulfilling the strict size limitations that are required in present portable electronic devices. If fuel cells are stacked the output voltage can be increased but this generally comes at the cost of an increase in both complexity and size of the fuel cell and thereby the portable electronic device comprising the fuel cell. Alternatively the fuel cell can be implemented in a configuration where the fuel cell charges a second battery (e.g. of the Li-ion type), whereby the output voltage can be controlled by the second battery and the load dependence mitigated, but this solution also comes at the cost of an increase in size of the portable electronic device comprising the fuel cell configuration.

It is therefore a feature of the present invention to provide a portable electronic device that can be powered by a low voltage fuel cell.

It is another feature of the present invention to provide a portable electronic device that is powered by a low voltage fuel cell and optimized with respect to miniaturization of the device.

It is yet another feature of the present invention to provide a portable electronic device that is powered by a low voltage fuel cell and optimized with respect to mitigation of the load dependence of the fuel cell.

SUMMARY OF THE INVENTION

The invention in a first aspect provides a portable electronic device according to claim 1.

This provides a portable electronic device that is powered by a low voltage fuel cell and is optimized with respect to size.

The invention in a second aspect provides a method of operating a portable electronic device according to claim 15.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

Providing a portable electronic device according to the invention it has been demonstrated that a single fuel cell in combination with a voltage boost converter can be used to power the portable electronic device.

Figure 1:
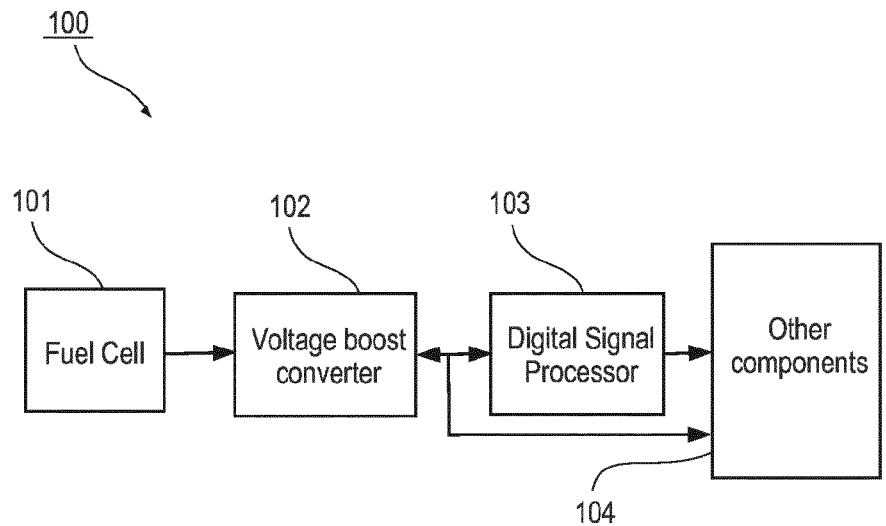
FIG. 1 illustrates highly schematically a portable electronic device according to an embodiment of the invention.

Reference is first made to FIG. 1, which highly schematically illustrates a portable electronic device 100 according to an embodiment of the invention comprising a fuel cell 101, a voltage boost converter 102, a digital signal processor (DSP) 103 and other electronic components 104. The fuel cell 101 provides electrical power at a relatively low voltage to the voltage boost converter 102 which in turn provides electric power at a higher voltage to the DSP (103) and the other electrical components 104 of the portable electronic device 100.

This configuration is advantageous in that the voltage boost converter takes up very little space while allowing the portable electronic device to be powered by a single low voltage fuel cell as opposed to e.g. a fuel cell stack. The voltage boost converter takes up very little space since it can be implemented mainly as an integrated circuit (chip) as will be further described below.

In a specific variation of said embodiment the portable electronic device 100 is a hearing aid and the fuel cell 101 is of the direct methanol type (DMFC). This embodiment is especially advantageous because miniaturization is specifically important in the design of hearing aids in order to avoid stigmatizing the hearing aid user.

In variations of the embodiment of FIG. 1, the fuel cell 101 is of the direct alcohol type (DAFC) which is a more general term that includes DMFCs. In further variations of the embodiment of FIG. 1, the fuel cell 101 is any low voltage power supply that is not capable of providing an output voltage of a level sufficient to operate the portable electronic device.

Figure 2:
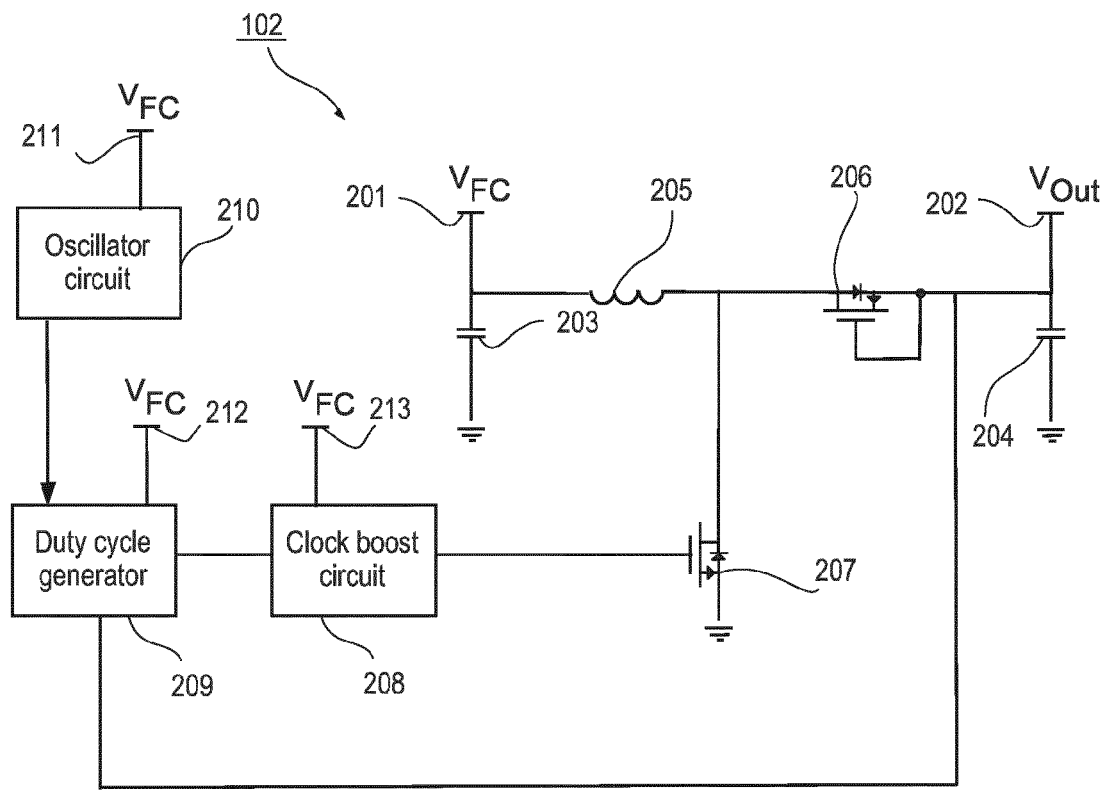
FIG. 2 illustrates highly schematically a voltage boost converter for a portable electronic device according to an embodiment of the invention.

Reference is now made to FIG. 2, which highly schematically illustrates a voltage boost converter 102 according to an embodiment of the invention. The voltage boost converter comprises an input voltage terminal 201, an output voltage terminal 202, an input capacitor 203, an output capacitor 204, an inductive element 205, a first digital switch 206, a second digital switch 207, a clock boost circuit 208, a digital duty cycle generator 209, an oscillator circuit 210 with corresponding voltage terminal 211 and voltage terminals 212 and 213 for supplying electrical power to the digital duty cycle generator 209 and clock boost circuit 208 respectively.

When the fuel cell 101 is connected to the portable electronic device 100 a positive electric voltage is provided to the input terminal 201, the digital duty cycle generator terminal 212, the clock boost circuit terminal 213, the oscillator circuit terminal 211 and the output terminal 202. The electrical voltage on the output terminal 202 is not provided directly by the fuel cell 101, but as a consequence of the voltage applied to the former three terminals and the operation of the voltage boost converter 102.

The oscillator circuit 210 provides a 32 MHz digital clock signal to the digital duty cycle generator 209, wherein an adjustable clock counter provides a frequency downscaled digital clock signal that is duty cycle modulated as a function of the magnitude of the output voltage from the voltage boost converter. The oscillator circuit 210 comprises an RC oscillator or another low supply voltage oscillator.

The digital duty cycle generator 209 is adapted to operate in feedback mode and only sample the fuel cell voltage at a frequency of 100 kHz. The fuel cell voltage is sampled in order to being able to select an appropriate duty cycle. The voltage of the fuel cell is sampled using a circuit that is specifically adapted to operate at a low supply voltage, as will be further discussed below with reference to FIG. 6. Partly as a consequence hereof the voltage boost converter can be powered by the fuel cell 101 alone.

Figure 6:
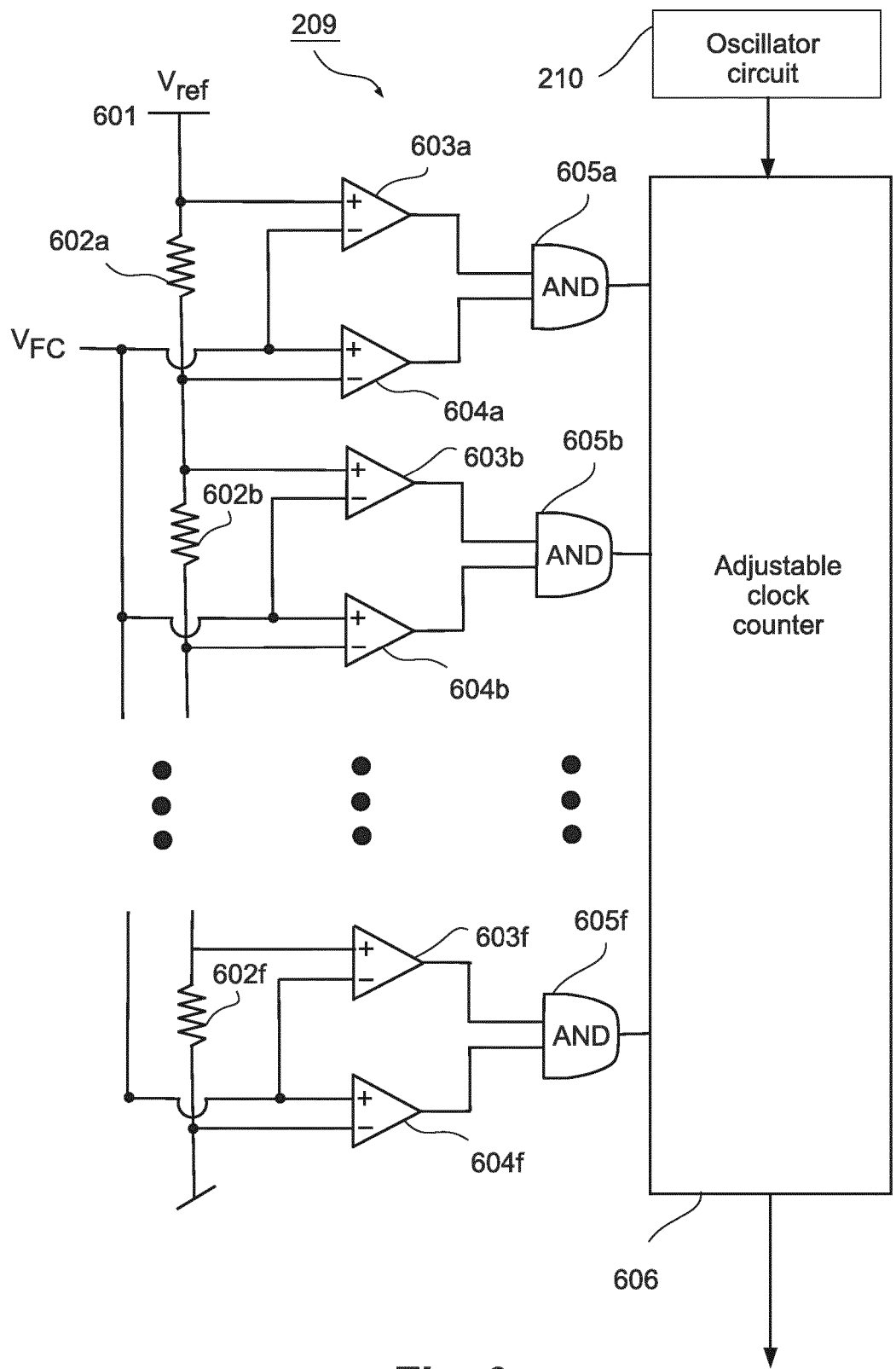
FIG. 6 illustrates highly schematically the digital duty cycle generator, according to the embodiments of FIG. 2 and FIG. 5; in greater detail.

Reference is now given to FIG. 6, which, highly schematically, illustrates the digital duty cycle generator 209 comprising a reference voltage 601, a voltage divider comprising six resistors 602a, 602b, ... 602f, six pairs of comparators 603a, 603b, ... 603f and 604a, 604b, ... 604f, six AND gates 605a, 605b, ... 605f and an adjustable clock counter 606.

The first comparator 603a is connected to the first (highest) electrical voltage of the voltage divider and to the fuel cell voltage and the second comparator 604a is connected to the second (next highest) electrical voltage of the voltage divider and to the fuel cell voltage. The output from the first and second comparators 603a and 604a are fed to the AND gate 605a. The comparator set 603a and 604a and the AND gate 605a are configured such that the output of the AND gate 605a will only be set to high when the fuel cell voltage is located in the interval between said first and second electric voltage. The other comparators and AND gates are arranged in a similar manner. The comparators 603a, 603b, ... 603f and 604a, 604b, ... 604f are operated at a sampling frequency of only 100 kHz, which is sufficient for following the variations of the fuel cell voltage.

The adjustable clock counter 606 down-scales the digital clock signal from the oscillator circuit 210 from 32 MHz to 3 MHz and modulates the duty cycle of the down-scaled clock signal dependent on the determined fuel cell electrical voltage. This provides a digital duty cycle generator 209 that requires a low supply voltage and is energy efficient. This low supply voltage is partly a result of the mainly digital implementation and partly a result of the relative low frequency used for sampling the fuel cell voltage or boosted output voltage. It has been shown that the digital duty cycle generator 209 can be powered directly by a single DMFC without requiring any additional power source to aid in the start-up phase.

In the present context the term "phase" is interchangeable with the term "mode of operation".

In a variation of the digital duty cycle generator according to FIG. 6 the voltage divider comprises six transistors with varying gate thresholds, that are arranged such that the electrical voltage of the fuel cell is connected to the gates of the transistors, and the electrical voltage at the transistor drains is connected to the AND gates, whereby the six resistors of the voltage divider as well as the six set of comparators can be replaced by six transistors with distinct gate thresholds.

In still other variations of the digital duty cycle generator according to FIG. 6 the number of resistors, comparator sets and AND gates can be any number in the range between two and twenty. In an alternative variation of the embodiment according to FIG. 6 the resistors, comparator sets and AND gates can be omitted if the fuel cell is developed to a level where the fuel cell output voltage dependence of the load can be kept within a very limited range such as e.g. a resulting fuel cell output voltage between 0.5 V and 0.6 V.

In yet other variations the sampling frequency of the fuel cell voltage can be in the range between 100 Hz and 10 MHz and the frequency of the duty cycle modulated signal can be in the range between 100 kHz and 100 MHz. In a further specific variation the frequency of the duty cycle modulated signal is switched, by the adjustable clock counter 606, between two values e.g. 5 MHz and 6 MHz. Hereby the range of available duty cycle values can be increased because a 5 MHz signal that is duty cycle modulated by a 30 MHz signal can provide duty cycles of 17%, 33%, 50%, 66% and 83% and a 6 MHz signal that is duty cycle modulated by a 30 MHz signal can provide duty cycles of 20%, 40%, 60% and 80%.

In other variations of the digital duty cycle generator according to FIG. 6 the fuel cell voltage is sampled instead of the boost converter output voltage and the boost converter is hereby operated in feed forward mode. Generally it is preferred to operate the boost converter in feedback mode because this mode is more tolerant towards process variations and environmental changes such as temperature variations.

In the present context the fuel cell voltage and the boost converter output voltage include any voltage derived directly from these.

In yet other variations of the digital duty cycle generator according to FIG. 6 the adjustable clock counter 606 is operated asynchronous whereby clocking of the comparators will no longer be required. The duty cycle modulated clock signal is provided to the clock boost circuit 213 wherein the voltage of said signal in the "high" state is increased to two times the fuel cell voltage. The clock boost circuit is described further below with reference to FIG. 3 and FIG. 4. The voltage doubled duty cycle modulated control signal is used to drive the second digital switch 207 and as soon as the second digital switch 207 starts operating the voltage at the output terminal 202 will be boosted relative to the voltage at input terminal 201 as a consequence of the well-known principles for switched mode voltage boosting. The first digital switch 206 is implemented as MOSFET but not actively driven and will therefore act as a passive diode; this phenomenon may in the following be denoted to be due to the inherent body diode.

For further details concerning the principles of boost converters see e.g. the book: "Switch mode power conversion (Electrical and Computer engineering, vol. 22), by K. K. Sum.

In a variation of the embodiment of FIG. 2 the oscillator circuit 210 is not part of the boost voltage converter 102. Instead the digital clock signal is extracted from the portable electronic device 100. In a further variation the digital clock signal can be extracted without having to power up the remaining electronic components 104 of the portable electronic device 100.

In a specific variation of the embodiment of FIG. 2 the output capacitor 204 has a capacitance of 5 uF, the input capacitor 203 has a capacitance of 10 uF and the inductive element 205 has an inductance of 10 uH. Obviously these values also depend on the selected operating frequency for the boost converter.

Figure 3:
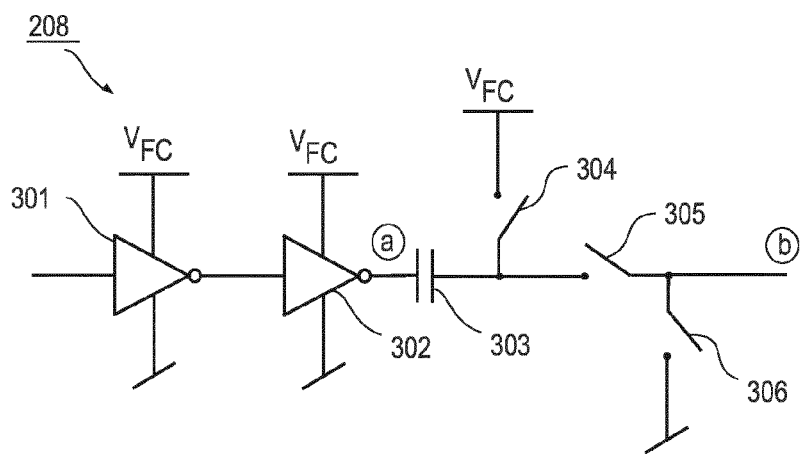
FIG. 3 illustrates highly schematically the clock boost circuit, according to the embodiments of FIG. 2 and FIG. 5, in greater detail.

Reference is now made to FIG. 3, which, highly schematically, illustrates the clock boost circuit 208 according to an embodiment of the invention. The clock boost circuit 208 comprises a first inverter 301, a second inverter 302, a capacitor 303 and a first, a second and a third switch 304, 305 and 306.

Figure 4:
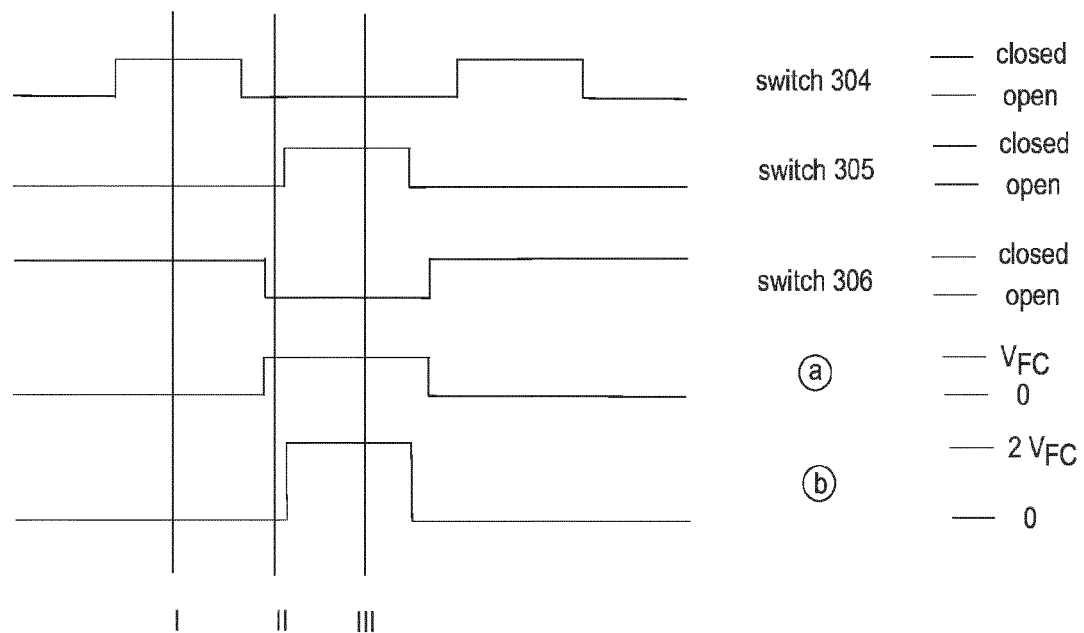
FIG. 4 illustrates highly schematically panes of electrical signals in the clock boost circuit according to the embodiment of FIG. 3.

Reference is now made to FIG. 4 that illustrates the varying states of the switches in the clock boost circuit together with the voltage at selected points. In a first state I the first switch 304 and the third switch 306 are closed and the second switch 305 is open. Assuming that the clock signal provided from the digital duty cycle generator 209 is low (and the voltage at "a" therefore is low) the result is that the capacitor 303 will be charged. In a second state II all three switches are open and the clock signal is "high" (and the voltage at "a" is therefore high), whereby, in a third state III, a voltage at "b" is two times the magnitude of the original clock signal and provided by closing the second switch 305. Hereby the voltage of the duty cycle modulated clock signal is doubled, which may be critical for operation of the voltage boost converter 102 because said clock signal is used to drive the second digital switch 207, which may require a voltage that is larger than the voltage the fuel cell can provide when it is more than lightly loaded.

Figure 5:
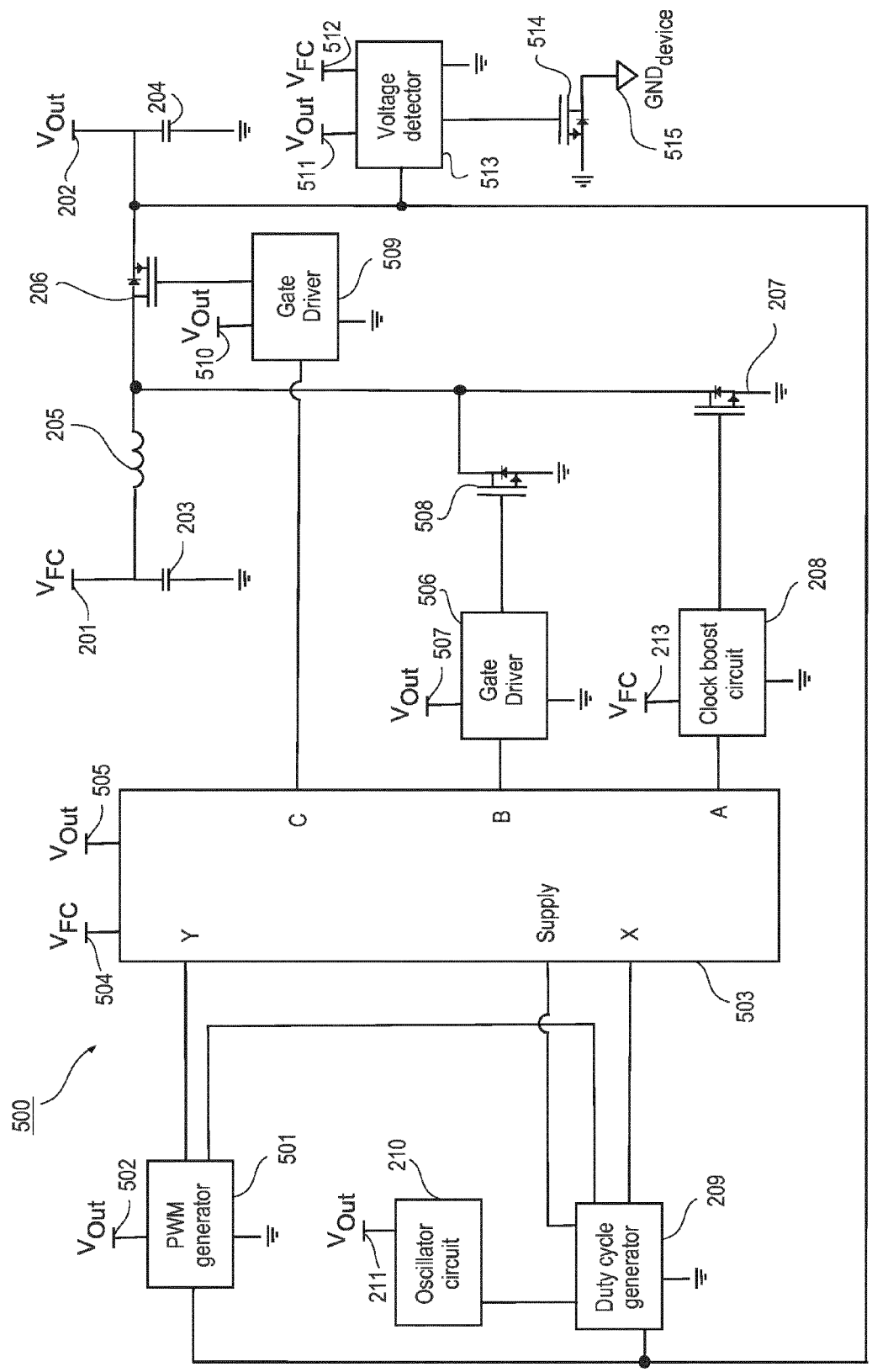
FIG. 5 illustrates highly schematically a voltage boost converter circuit for a portable electronic device according to an embodiment of the invention.

Reference is now made to FIG. 5, which, highly schematically, illustrates a block diagram of a voltage boost converter circuit 500 according to another embodiment of the invention. In addition to the elements already described with reference to the voltage boost converter of FIG. 2, the boost converter circuit according to the embodiment of FIG. 5 further comprises a Pulse-width Modulation (PWM) generator 501 that has electrical power supplied from terminal 502, a selector 503, which has electrical power supplied selectively from terminal 504 that is directly connected to the fuel cell 101 or from terminal 505 that is directly connected to the boost converter output terminal 202, a first gate driver 506 and a second gate driver 509, which has electrical power supplied from terminal 507 and terminal 510 respectively and wherein both said terminals are connected to the boost converter output terminal 202, and finally a third switch 508.

In a start-up phase, the fuel cell 101 is lightly loaded. Most types of fuel cells will therefore, in the start-up phase, be capable of providing the voltage and electrical power required to operate the part of the voltage boost converter circuit that has already been described with reference to FIG. 2, and to operate the selector 503, which sees to that the second switch 207 is actively driven, while the first switch 206 and the third switch 508 are not actively driven, though the first switch 206 operates as a passive diode due to the inherent body diode. At the end of said start-up phase, the output from the voltage boost converter circuit is sufficient to additionally power up the Pulse-Width Modulation (PWM) generator 501 and to start actively driving said first 206 and third switch 508. In this phase the third switch 508 is driven in-phase with the second switch 207, and the first switch 206 is driven out-of-phase. When the first switch 206 is actively driven, it operates as a synchronous rectifier whereby the voltage loss across the switch is reduced. Thus, this intermediate phase is initiated by the selector 503 when it detects that the level of the boosted output voltage has reached a given trigger level, and in response hereto the selector 503 activates said first 206 and third switch 207 and the corresponding gate drivers 506 and 509.

In variations hereof various averages of the boosted output voltage are used as input to the trigger functionality in the selector 503.

According to the embodiment of FIG. 5 the PWM generator uses a down-scaled clock signal provided from the duty cycle generator 209.

A voltage detector 513 arranged in parallel with the output terminal 202 is adapted to be triggered when the electrical voltage at the output terminal reach a level that implies that the PWM is fully operational. This can be determined because the boost converter described with reference to FIG. 2, i.e. the part of the boost converter circuit controlled by the digital duty cycle generator 209, is adapted such that it cannot by itself provide a boosted output voltage that triggers said voltage detector. This can be done because a direct relation exists between the duty cycle DC, the input voltage $V_i$ and the output voltage $V_o$ of the boost converter For an ideal loss free system the relation can be expressed as:

$$DC=1-(V_i/V_o)$$

The voltage detector 513 has electrical power supplied from terminal 511 that is directly connected to the boost converter output terminal 202. The voltage detector 513 also monitors the voltage of the fuel cell 101 via terminal 512, thus enabling it to respond to overload conditions where the fuel cell 101 voltage may drop below a predetermined threshold. When the voltage detector is triggered, the second switch 207, the digital duty cycle generator 209 and the clock boost circuit 208 are first disabled or operated in a special mode in order to reduce the overall power consumption. Finally, the boost converter circuit starts to power the remaining parts of the portable electronic device. This is done by a fourth switch 514, which is controlled by the voltage detector, which, when activated, short-circuits the ground 515 of the remaining parts of the portable electronic device with the ground of the boost converter circuit, whereby electrical power from the boost converter circuit is provided to the remaining parts of the portable electronic device. During overload conditions where the maximum power capabilities of the fuel cell 101 are exceeded, the fourth switch 514 can be deactivated, thereby significantly reducing the power demands.

In particular the digital duty cycle generator 209 can be operated in a power saving mode where the duty cycle modulation is disabled while the digital duty cycle generator still provides a down-scaled clock signal to the PWM generator 501. Thus in this mode only the adjustable clock counter 606 of the digital duty cycle generator is active. In a start-up phase the digital duty cycle generator 209 generates the duty cycle modulated clock signal used to drive the boost converter circuit 500. In an intermediate phase both the digital duty cycle generator 209 and the PWM generator 501 are active in driving the boost converter circuit 500 and in a normal mode of operation the PWM generator alone generates the duty cycle modulated clock signal used to drive the boost converter circuit 500.

According to one variation of the embodiment of FIG. 5, the intermediate phase is omitted and according to another variation the normal mode of operation is not exclusively controlled by the PWM generator 501.

According to a variation of the embodiment of FIG. 5, the PWM generator 501 is adapted such that the digital clock signal selectively can be provided from different oscillator circuits. According to one specific embodiment, an RC oscillator circuit is active in a start-up phase, in order to reduce the requirements to the supply voltage during start-up, and in a subsequent phase, the RC oscillator is replaced by a more precise crystal oscillator that requires a higher supply voltage.

Figure 7:
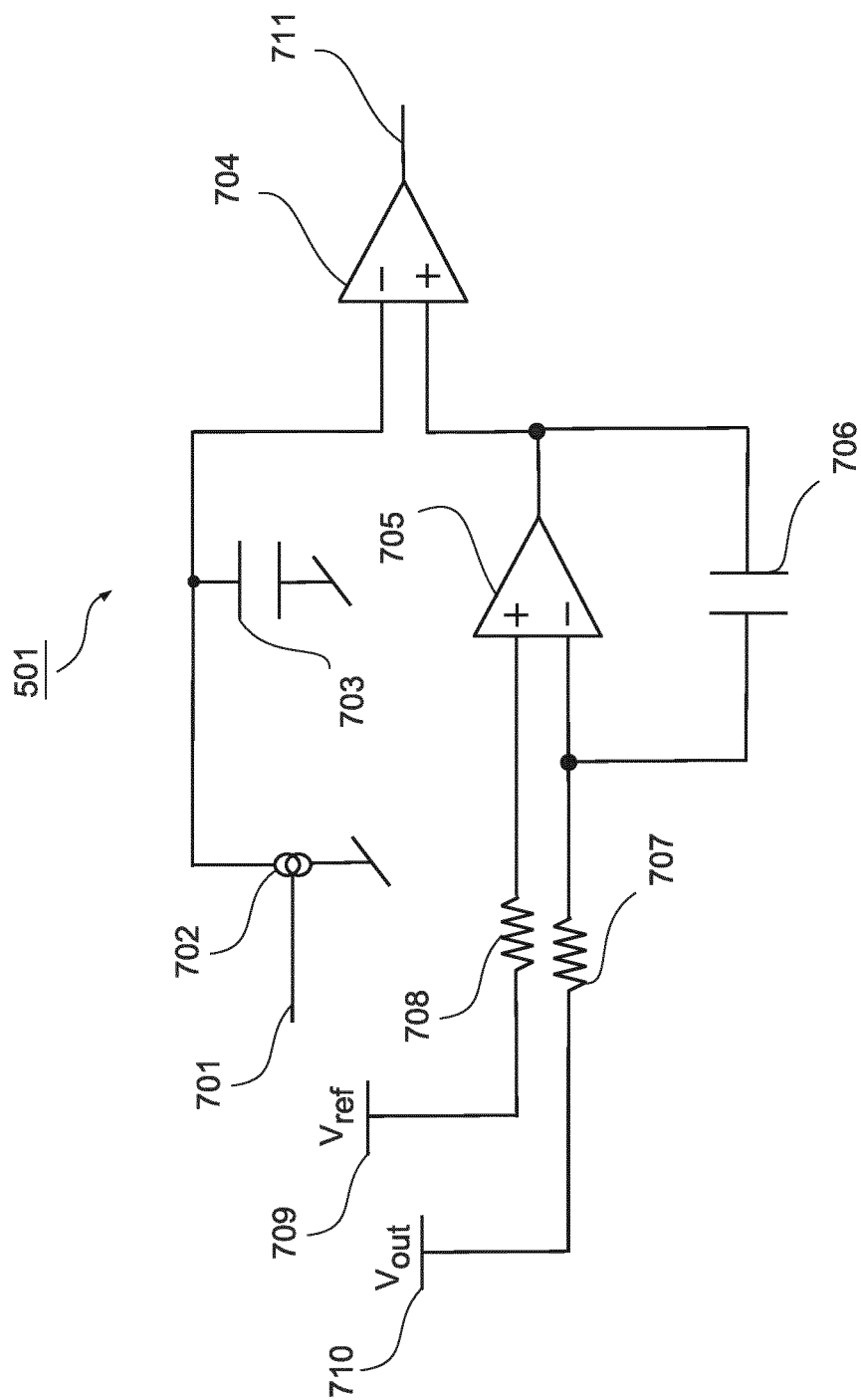
FIG. 7 illustrates highly schematically the Pulse-width Modulation generator, according to the embodiment of FIG. 5, in greater detail.

Reference is now made to FIG. 7, which highly schematically, illustrates the PWM generator 501 according to the embodiment of FIG. 5. The PWM generator comprises a current generator 702, a first capacitor 703, a comparator 704, an operational amplifier 705, a second capacitor 706, a first and a second resistor 707 and 708, a first terminal 709 connected to a reference voltage and a second terminal 710 connected to the output voltage of the boost converter 500 from the embodiment of FIG. 5.

A downscaled digital clock signal 701 with a clock frequency of 3 MHz is input to the PWM generator 501, from the digital duty cycle generator 209, where the current generator 702 provides an alternating positive and negative bias current in response to the digital clock signal 701. The current generator 702 is coupled in parallel with the first capacitor 703 and the comparator 704 and therefore provides at the (negative) input of the comparator 704 a sawtooth signal. The other (positive) input of the comparator 704 is provided by the operational amplifier 705, which has its output coupled back, through the second capacitor 706, to the negative input of the operational amplifier 705, which also, through a first resistor, is connected to the second terminal 710. The positive input of the operational amplifier 705 is, through a second resistor, connected to the first terminal 709.

The output signal 711 provided by the comparator 704 will be a square signal with a frequency that follows the frequency of the downscaled digital clock signal 701 and a duty cycle, which is higher than the nominal value when the boost converter electric voltage at the second terminal 710 is lower than the selected reference electric voltage at the first terminal 709, and wherein the duty cycle is lower than the nominal value if the boost converter electric voltage at the second terminal 710 is higher than the selected reference electric voltage at the first terminal 709. The comparator 704 is selected such that the bandwidth is an order of magnitude larger than the frequency of the downscaled digital clock signal 701.

This provides a PWM generator 501 capable of generating an output signal 711 that is regulated fast and with a high resolution, whereby the output voltage from the boost converter circuit 500 according to the embodiment of FIG. 5 can be kept at the desired value with only minor deviations there from (i.e. an improved stability of the boosted voltage).

However, this high quality boost converter output comes at the cost of a higher power consumption and requires a higher supply voltage level compared to the previously described digital duty cycle generator 209. This is partly because the analog operational amplifier 705 of the PWM generator 501 consumes more power and requires a higher supply voltage than the corresponding digital components used in the digital duty cycle generator 209, and partly because the bandwidth of the PWM generator 501 is considerably higher than the corresponding sampling frequency of the fuel cell voltage in the digital duty cycle generator 209.

In general the boost converter circuitry 500 is further advantageous in that the normal mode of operation is a highly power efficient mode of operation. This increase in power efficiency relative to the start-up and intermediate phases is primarily due to the higher gate-source voltage (and corresponding lower on-resistance) of the switches 206, 508 and

514 that can be provided from the boosted output voltage when the boost converter circuitry 500 is operated in said normal mode.

Another advantage of the higher gate-source voltage is the higher saturation current and hereby higher peak-power that the switches 206, 508 and 514 can provide when the boost converter circuitry 500 is operated in said normal mode.

Therefore the boost converter circuitry 500 provides at least two modes of operation such that the circuitry selectively can be optimized with respect to either low supply voltage operation or high quality operation, wherein the high quality mode of operation is characterized by having at least one of the features: higher power efficiency, higher peak-power or more stable boosted voltage relative to the low supply voltage mode of operation. In the following the high quality mode of operation may also be denoted the normal mode of operation.

The boost converters according to the embodiments of FIG. 2 and FIG. 5 are both characterized by being based on a magnetic field storage component (the coil 205) to store the input energy temporarily and subsequently release that energy to the output at a boosted electric voltage. A drawback for this type of converter is the electromagnetic noise resulting from the continuously varying magnetic fields.

Electromagnetic noise may in particular be a problem for portable electronic devices adapted for wireless communication, such as e.g. most modern hearing aids. According to a specific embodiment according to the invention the boost converter is therefore based on fixed frequency switching (duty cycle modulation) wherein the clock frequency of the duty cycle modulated control signal is selected such that the control signal and its harmonics do not interfere with a wireless communication system of the portable electronic device.

A portable electronic device according to the invention is further advantageous in that the boost converter is well suited for power management.

It is a well-known issue for battery powered electronic devices, that in case the current drawn from the power supply exceeds an upper limit, the output voltage provided by the power supply will start to decrease. In order to avoid that the output voltage decreases below a critical level, where e.g. a reboot of the digital electronics will be required, a variety of methods have been suggested for limiting the current draw, including temporarily disconnecting selected parts of the electronic device or using an analog current limiter.

According to the present invention, the boost converter can in a simple manner lower the output voltage and hereby the current draw in response to an excessive current draw.

If, during normal operation of the portable electronic device, the boost converter output voltage drops below a specified level this is considered to be caused by excessive power drain and therefore triggers that electrical power is no longer provided to the remaining parts of the portable electronic device. The instantaneous power drain is therefore dramatically reduced which allows the boost converter output voltage to recover and return to its normal nominal level whereby the remaining parts of the portable electronic device can again be powered from the boost converter.

According to variations of the disclosed embodiments the boost converter increases the fuel cell output voltage to a level in the range between 1.1 and 1.6 V, or in the range between 1.3 and 1.6 V or about 1.5 V.

The invention claimed is:

1. A portable electronic device adapted to be worn, at least partly, in or at a human ear, comprising a fuel cell and a boost converter, wherein said boost converter is adapted for increasing the fuel cell output voltage to a level suitable to power the portable electronic device and wherein said boost converter is powered by the fuel cell, said device further comprising a digital duty cycle generator adapted for operating the boost converter circuit with a low supply voltage, and a pulse-width modulation generator adapted for operating the boost converter circuit with high stability of the boosted voltage.

2. The portable electronic device according to claim 1, wherein the boost converter comprises a boost converter circuitry adapted such that the circuitry can be operated in a start-up mode optimized with respect to low supply voltage operation.

3. The portable electronic device according to claim 2, wherein the boost converter circuitry, is adapted for operating in a start-up mode optimized with respect to low supply voltage operation and for operating in a normal mode wherein said normal mode of operation is optimized with respect to at least one feature selected from a group comprising: stability of the boosted voltage, power efficiency of the boost converter circuitry, and the peak power that the boost converter circuitry can provide.

4. The portable electronic device according claim 1, wherein the boost converter circuitry comprises trigger means adapted to switch the mode of operation between start-up mode and normal mode as a function of the level of the boosted voltage.

5. The portable electronic device according to claim 1, wherein the boost converter circuitry is adapted for operating during transition from the start-up mode to the normal mode in an intermediate mode of operation.

6. A portable electronic device adapted to be worn, at least partly, in or at a human ear, comprising a fuel cell and a boost converter, wherein said boost converter is adapted for increasing the fuel cell output voltage to a level suitable to power the portable electronic device and wherein said boost converter is powered by the fuel cell, said device further comprising a clock boost circuit adapted for increasing the voltage of a clock signal.

7. The portable electronic device according to claim 1, comprising an RC oscillator circuit and a crystal oscillator.

8. The portable electronic device according to claim 1, wherein the pulse-width modulation generator is operated in a feedback configuration.

9. The portable electronic device according to claim 1, wherein the digital duty cycle generator samples the fuel cell voltage or the boost converter output voltage at a frequency in the range between 100 Hz and 10 MHz, and wherein the pulse-width modulation generator is adapted to provide a bandwidth that is at least a factor of 5 larger than the frequency of the clock signal output from the pulse-width modulation generator.

10. The portable electronic device according to claim 1, wherein the digital duty cycle generator is adapted to provide a boosted voltage at a first level and wherein the pulse-width modulation generator is adapted to provide a boosted voltage at a second level, wherein said second level is larger than said first level, whereby a simple voltage detection can be used to determine whether the boost converter circuit is ready to supply voltage to the remaining parts of the portable electronic device.

11. The portable electronic device according to claim 1, wherein the digital duty cycle generator comprises means for sampling the fuel cell voltage or the boost converter output voltage and means for adjusting the duty cycle of a digital clock signal in response to the value of said sampled voltage.

12. The portable electronic device according to claim 11, wherein said sampling means comprises two transistors with distinct transistor gate thresholds, that are arranged such that said voltage to be sampled is connected to the gates of the transistors and the voltage at the transistor drains is connected to a logic gate, whereby the output from the logic gate can be used to determine the value of said voltage relative to the two transistor gate thresholds.

13. The portable electronic device according to claim 1, wherein the portable electronic device is a hearing aid.

14. The portable electronic device according to claim 1, wherein the fuel cell is of the direct alcohol fuel cell type.

15. A method of operating a portable electronic device comprising the steps of:

provteriding a low voltage power supply, providing a boost converter circuitry, operating the boost converter circuitry in a first mode optimized for low supply voltage operation, switching from said first mode of operation to a second mode of operation in response to the detection of a trigger event, wherein said trigger event comprises an average of detections of events of said boosted voltage surpassing a predetermined threshold level, operating the boost converter circuitry in said second mode of operation, wherein said second mode of operation is optimized with respect to at least one feature selected from a group comprising: stability of the boosted voltage, power efficiency of the boost converter circuitry, and the peak power that the boost converter circuitry can provide.

* * * * *